United States Patent
Giron et al.

(10) Patent No.: US 8,824,038 B2
(45) Date of Patent: Sep. 2, 2014

(54) ELECTROCHROMIC DEVICE

(76) Inventors: Jean-Christophe Giron, Eupen (BE); René Gy, Bondy (FR); Thomas Bertin-Mourot, Paris (FR)

(\*) Notice: Subject to any disclaimer, the term of this patent is extended or adjusted under 35 U.S.C. 154(b) by 20 days.

(21) Appl. No.: 13/386,277

(22) PCT Filed: Jul. 21, 2010

(86) PCT No.: PCT/FR2010/051543
§ 371 (c)(1),
(2), (4) Date: May 7, 2012

(87) PCT Pub. No.: WO2011/010067
PCT Pub. Date: Jan. 27, 2011

(65) Prior Publication Data
US 2012/0212794 A1 Aug. 23, 2012

(30) Foreign Application Priority Data
Jul. 22, 2009 (FR) ...................... 09 55119

(51) Int. Cl.
*G02F 1/153* (2006.01)
*G02F 1/03* (2006.01)
*G09G 3/19* (2006.01)
*H04N 9/16* (2006.01)

(52) U.S. Cl.
USPC ............. 359/275; 359/242; 359/265; 345/49; 348/817

(58) Field of Classification Search
USPC ......... 359/265–275, 277, 245–247, 254, 242; 345/49, 105; 250/70; 348/814, 817; 438/929; 349/182–186
See application file for complete search history.

(56) References Cited

U.S. PATENT DOCUMENTS

| 4,281,208 A | 7/1981 | Kuwano et al. |
| 4,293,194 A | 10/1981 | Takahashi et al. |
| 4,652,090 A | 3/1987 | Uchikawa et al. |
| 4,719,501 A | 1/1988 | Nakagawa et al. |
| 4,824,221 A | 4/1989 | Endo et al. |
| 4,832,463 A | 5/1989 | Goldner et al. |
| 4,867,541 A | 9/1989 | Hotomi et al. |
| 4,876,628 A | 10/1989 | Goldner et al. |
| 4,878,993 A | 11/1989 | Rossi et al. |
| 4,889,414 A | 12/1989 | Rauh et al. |

(Continued)

FOREIGN PATENT DOCUMENTS

| EP | 0730189 | 9/1996 |
| EP | 1369740 | 12/2003 |

(Continued)

OTHER PUBLICATIONS

C.G. Granvist, Handbook of Inorganic Electrochromic Materials, 1995: Elsevier.

(Continued)

*Primary Examiner* — Dawayne A Pinkney
(74) *Attorney, Agent, or Firm* — Lerner, David, Littenberg, Krumholz & Mentlik, LLP

(57) ABSTRACT

The invention relates to an electrochromic device including a first non-tempered glass substrate (S1), the linear thermal expansion coefficient of which is between 35 and $60 \cdot 10^{-7}/°C$., said substrate (S1) being coated with a stack including at least one transparent electrically conductive layer (2, 4), an electrochromic material layer (EC2), an ion-conductive electrolyte layer (EL), and a counter electrode (EC1).

15 Claims, 1 Drawing Sheet

(56) References Cited

U.S. PATENT DOCUMENTS

| | | |
|---|---|---|
| 4,938,571 A | 7/1990 | Cogan et al. |
| 4,960,324 A | 10/1990 | Brown |
| 5,019,420 A | 5/1991 | Rauh |
| 5,051,274 A | 9/1991 | Goldner et al. |
| 5,069,535 A | 12/1991 | Baucke et al. |
| 5,080,471 A | 1/1992 | Cogan et al. |
| 5,084,777 A | 1/1992 | Slobodin |
| 5,133,594 A | 7/1992 | Haas et al. |
| 5,151,224 A | 9/1992 | Madou et al. |
| 5,171,413 A | 12/1992 | Arntz et al. |
| 5,189,550 A | 2/1993 | Goldner et al. |
| RE34,469 E | 12/1993 | Cogan et al. |
| 5,288,433 A | 2/1994 | Stevens et al. |
| 5,307,201 A | 4/1994 | Passerini et al. |
| 5,321,544 A | 6/1994 | Parkhe et al. |
| 5,327,281 A | 7/1994 | Cogan et al. |
| 5,372,992 A | 12/1994 | Itozaki et al. |
| 5,404,244 A | 4/1995 | Van Dine et al. |
| 5,497,306 A | 3/1996 | Pastrick |
| 5,532,869 A | 7/1996 | Goldner et al. |
| 5,659,417 A | 8/1997 | Van Dine et al. |
| 5,668,663 A | 9/1997 | Varaprasad et al. |
| 5,669,699 A | 9/1997 | Pastrick et al. |
| 5,669,704 A | 9/1997 | Pastrick |
| 5,671,996 A | 9/1997 | Bos et al. |
| 5,684,619 A | 11/1997 | Shabrang et al. |
| 5,699,192 A | 12/1997 | Van Dine et al. |
| 5,724,177 A | 3/1998 | Ellis, Jr. et al. |
| 5,757,537 A | 5/1998 | Ellis, Jr. et al. |
| 5,768,004 A | 6/1998 | Cogan |
| 5,793,518 A | 8/1998 | Lefrou et al. |
| 5,823,654 A | 10/1998 | Pastrick et al. |
| 5,831,760 A | 11/1998 | Hashimoto et al. |
| 5,879,074 A | 3/1999 | Pastrick |
| 5,938,321 A | 8/1999 | Bos et al. |
| 5,985,486 A | 11/1999 | Giron |
| 6,063,718 A | 5/2000 | El Khiati et al. |
| 6,086,229 A | 7/2000 | Pastrick |
| 6,087,953 A | 7/2000 | DeLine et al. |
| 6,094,292 A | 7/2000 | Goldner et al. |
| 6,139,172 A | 10/2000 | Bos et al. |
| 6,149,287 A | 11/2000 | Pastrick et al. |
| 6,172,613 B1 | 1/2001 | DeLine et al. |
| 6,178,034 B1 | 1/2001 | Allemand et al. |
| 6,211,995 B1 | 4/2001 | Azens et al. |
| 6,222,460 B1 | 4/2001 | DeLine et al. |
| 6,266,177 B1 | 7/2001 | Allemand et al. |
| 6,277,523 B1 | 8/2001 | Giron |
| 6,296,379 B1 | 10/2001 | Pastrick |
| 6,299,333 B1 | 10/2001 | Pastrick et al. |
| 6,326,900 B2 | 12/2001 | DeLine et al. |
| 6,366,213 B2 | 4/2002 | DeLine et al. |
| 6,412,973 B1 | 7/2002 | Bos et al. |
| 6,420,071 B1 | 7/2002 | Lee et al. |
| 6,437,901 B1 | 8/2002 | Kobayashi et al. |
| 6,444,189 B1 | 9/2002 | Wang et al. |
| 6,464,692 B1 | 10/2002 | Ruiz et al. |
| 6,483,438 B2 | 11/2002 | DeLine et al. |
| 6,494,602 B2 | 12/2002 | Pastrick et al. |
| 6,498,358 B1 | 12/2002 | Lach et al. |
| 6,529,308 B2 | 3/2003 | Beteille et al. |
| 6,587,250 B2 | 7/2003 | Armgarth et al. |
| 6,630,566 B1 | 10/2003 | Allen et al. |
| 6,635,914 B2 | 10/2003 | Kozicki et al. |
| 6,642,851 B2 | 11/2003 | Deline et al. |
| 6,685,348 B2 | 2/2004 | Pastrick et al. |
| 6,795,226 B2 | 9/2004 | Agrawal et al. |
| 6,906,842 B2 | 6/2005 | Agrawal et al. |
| 6,940,628 B2 | 9/2005 | Giron |
| 6,952,299 B1 | 10/2005 | Fukazawa et al. |
| 7,042,615 B2 | 5/2006 | Richardson |
| 2009/0131238 A1 | 5/2009 | Kishimoto et al. |
| 2010/0084016 A1* | 4/2010 | Aitken et al. ............ 136/258 |
| 2010/0129944 A1 | 5/2010 | Shimada et al. |
| 2010/0245973 A1* | 9/2010 | Wang et al. ............ 359/275 |
| 2010/0300535 A1 | 12/2010 | Aitken et al. |
| 2010/0300536 A1 | 12/2010 | Aitken et al. |
| 2011/0017297 A1 | 1/2011 | Aitken et al. |
| 2011/0043887 A1* | 2/2011 | Valentin et al. ............ 359/275 |
| 2011/0051221 A1* | 3/2011 | Veerasamy ............ 359/275 |

FOREIGN PATENT DOCUMENTS

| | | |
|---|---|---|
| EP | 1696261 A1 | 8/2006 |
| JP | 61086734 | 5/1986 |
| JP | 10-206902 A | 8/1998 |
| JP | 11310432 A | 11/1999 |
| JP | 2004171008 A | 6/2004 |
| JP | 2005089259 A | 4/2005 |
| JP | 2005306719 A | 11/2005 |
| JP | 2007284307 A | 11/2007 |
| JP | 2008280189 A | 11/2008 |
| JP | 2009120407 A | 6/2009 |
| JP | 2009215165 A | 9/2009 |
| KR | 1020100080436 | 7/2010 |
| WO | 9415247 | 7/1994 |
| WO | 2009028570 A1 | 3/2009 |
| WO | 2010042460 A2 | 4/2010 |

OTHER PUBLICATIONS

Database WPI Week 200938 Thomson Scientific. London. GB; AN 2009-J89678 XP002571145, Abstract.
International Search Report for Application No. PCT/FR2010/051543 dated Jun. 14, 2011.
Kasturi L. Chopra, Thin Film Phenomena, McGraw Hill : 1969, pp. 479.
West, "Chapter 7: Electrical Properties", Basic Solid State Chemistry, 2nd Ed. Wiley 1999), p. 318-320.
Written Opinion for Application No. PCT/FR2010/051543 dated Jun. 14, 2011.
Chinese Office Action for Application No. 201080042257.3 dated Jan. 6, 2014.
Japanese Office Action for Application No. 2012-521087 dated May 13, 2014.

* cited by examiner

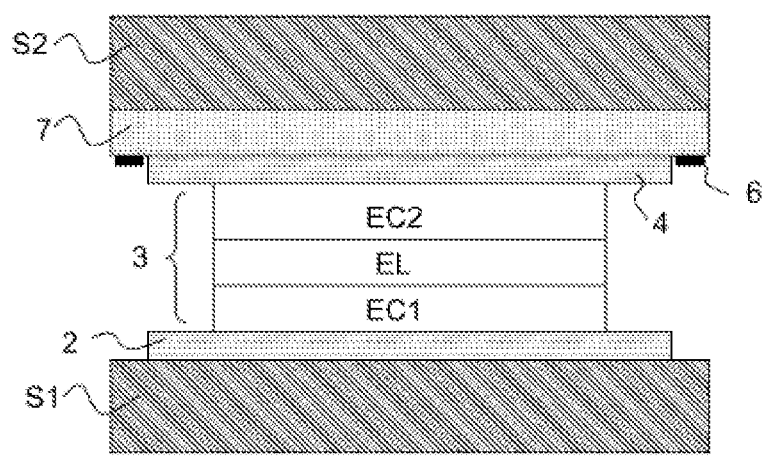

ELECTROCHROMIC DEVICE

CROSS REFERENCE TO RELATED APPLICATIONS

The present application is a national phase entry under 35 U.S.C. §371 of International Application No. PCT/FR2010/051543, filed Jul. 21, 2010, published in French, which claims the benefit of France Patent Application No. 0955119, filed Jul. 22, 2009. The disclosures of said applications are incorporated by reference herein.

The present invention consists of an electrochromic device with controlled transparency, designed mainly to create electrically controlled windows and their manufacturing process. It also concerns electrochromic windows fitted with a device of this type as well as the uses to which the device could be put, as well as the use of the latter for the widest variety of applications.

Windows are known for which the light transmission capacity, based on a good level of transparency, can be adjusted right through to total opacity. These windows have been shown to have applications in the most diverse technical fields.

They can thus be used as windows for a dwelling so that, for example, they can adjust the level of sunshine entering a location depending on outside conditions and as the users choose. They can also be used as insulation shades to preserve the privacy of the inhabitants of a location either in relation to the outside or in relation to adjoining rooms.

In the automotive field, such devices can be used, for example, to adjust the level of transparency of a windshield and/or the side-windows or roof glass in an automobile, as well as on certain automotive accessories, such as, especially, rear-view mirrors, in order to control the flow of light reflected toward the driver and prevent him/her being blinded by light. Of course, the device can be used in other fields, in particular in aeronautics, for example, to control the transparency of aircraft portholes/windows.

Since electrochromic devices are absorbent in their opaque state, they are liable to overheat when exposed to light, especially sunlight. This applies in particular to electrochromic devices used as display windows. When these windows are mounted in a frame, for example when used on the frontage of a building, the result is often the appearance of heat variations between the center of the glass and its edges, that are liable to cause the window to break. A shadow cast in bright sunlight could produce the same effect. For this reason, the substrates of soda-lime-silica glass used in electrochromic devices are currently tempered or hardened to give them increased thermo-mechanical resistance. The use of tempered or hardened glass has its disadvantages, however. This type of glass cannot be cut, so that thin films cannot be deposited on glass substrates unless they have first been cut to their final shape. Depending on the architectural projects in question, the final shapes to which the glass is cut can be very varied. When thin layers are applied to the glass by magnetron cathode sputtering, substrates of various sizes are placed on metal substrate supports. The settings for depositing the layers need to be adjusted individually to take account of the surface area ratio between the glass and the metal substrate support. This makes the process difficult to control. For economic and logistical reasons, and for ease of production, it would be preferable to be able to deposit these thin layers on substrates of a standard size, usually a large size, then to cut out the substrates to the desired size.

The inventors can show that this goal has been achieved thanks to the use of glass substrates of which the linear thermal expansion coefficient has been clearly determined.

The subject of the invention is therefore an electrochromic device comprising an initial untempered glass substrate of which the linear thermal expansion coefficient is 35 through $60 \cdot 10^{-7}/°$ C., the said substrate being coated with a stack consisting of at least one transparent electro-conductive layer, a layer of an electrochromic material, a layer of an ionic electrolyte conductor, and a counter-electrode. In fact, glass of the soda-lime-silica type currently used has a thermal expansion coefficient in the order of $89 \cdot 10^{-7}/°$ C.

The linear expansion coefficient refers to the average coefficient of linear expansion. This coefficient can be measured at a temperature close to ambient (typically 20° C., 30° C. or even 50° C.) and at a temperature lower than the vitreous transition temperature of the glass, for example, 300° C., 400° C., or even 500° C. Typically, the temperature range under consideration is the 20° C.-300° C. range. Since the lengthwise expansion of the glass varies linearly depending on temperature, in a temperature range lower than the vitreous transition temperature, the choice of temperatures does not materially affect the result.

The device in the invention preferably includes a second glass substrate, often known as the front surface substrate. This second substrate may also possess a linear thermal expansion coefficient as defined or, on the contrary, a standard linear thermal expansion coefficient for example, in the order of 85 to $90 \cdot 10^{-7}/°$ C.

Preferably, the first glass substrate should possess a lower linear thermal expansion coefficient of less than or equal to $50 \cdot 10^{-7}/°$ C., or less than or equal to $45 \cdot 10^{-7}/°$ C.

The first glass substrate should preferably be a silica-based glass oxide, of such a type that the $SiO_2$ content is greater than or equal to 40%, and notably 50%. Throughout this text, the content is provided in terms of mass concentrations.

The first glass substrate should preferably be of a chemical composition that includes the following oxides: $SiO_2$, $Al_2O_3$, and at least one oxide of an alkaline earth metal.

In addition to the previously mentioned oxides, the composition of the substrate could also contain boron oxide ($B_2O_3$) and/or at least one alkaline metal oxide.

The composition of the substrate may also contain one or more of the following oxides: $ZrO_2$, $P_2O_5$, ZnO, $SnO_2$, $SO_3$, $As_2O_2$, $Sb_2O_3$.

The substrate can also contain one or more colorants, including oxides of the following:

iron, vanadium, titanium, chromium, manganese, cobalt, nickel, copper, cerium, neodymium, praseodymium, and erbium, metal colloids, such as copper, silver, or gold, or those in an elementary or ionic form, such as selenium or sulfur.

The silica ($SiO_2$) content should preferably be 50 through 75%, especially between 50 and 65%. High content would in fact be accompanied by an increase in viscosity.

The alumina ($Al_2O_3$) content should preferably be 1 through 20%, notably 5 through 15%. High alumina content can lead to an increase in the viscosity of the glass as well as a tendency to devitrify.

Boron oxide ($B_2O_3$) can be usefully used to reduce both the viscosity of the glass and its thermal expansion coefficient. The content should preferably be less than or equal to 20%, and preferably 15%.

Alkaline earth metals include magnesium, calcium, strontium, and barium. Calcium and magnesium are preferable due to their low cost and low impact on the density of the glass. The oxides of an alkaline earth metal are useful for reducing the viscosity of the glass and facilitating fusion, without heavily penalizing the expansion coefficient. In large quantities, however, they could promote the devitrification of the glass. The total content would thus preferably be less than or equal to 25%, or even 20% and even 15%.

Alkaline metals include lithium, sodium, and potassium, these last two being preferable due to their low cost. Oxides of an alkaline metal have the effect of facilitating fusion with the glass by reducing its viscosity and its propensity to devitrify. These oxides lead, however, to a significant increase in the thermal expansion coefficient, so that the total content would preferably be less than or equal to 8%, especially 6% and even 5%.

The first substrate should preferably present with a chemical composition consisting of the following, within the mass limits defined hereunder.

| | |
|---|---|
| $SiO_2$ | 50 through 82%, preferably 50 through 75% |
| $B_2O_3$ | 0 through 20% |
| $Al_2O_3$ | 0 through 22% |
| MgO | 0 through 10% |
| CaO | 0 through 15% |
| SrO | 0 through 5% |
| BaO | 0 through 15% |
| CaO + MgO + BaO + SrO | 0 through 15%, preferably 5 through 15% |
| $Na_2O$ | 0 through 6% |
| $K_2O$ | 0 through 8% |
| $Na_2O + K_2O$ | 0 through 8%. |

Even more preferably, the first substrate should have a chemical composition constituted of the following, within the mass limits defined hereunder.

| | |
|---|---|
| $SiO_2$ | 50 through 60% |
| $B_2O_3$ | 10 through 15% |
| $Al_2O_3$ | 10 through 15% |
| MgO | 2 through 5% |
| CaO | 2 through 5% |
| SrO | 0 through 1% |
| BaO | 0 through 1% |
| CaO + MgO + BaO + SrO | 5 through 15% |
| $Na_2O$ | 0 through 5% |
| $K_2O$ | 0 through 5% |
| $Na_2O + K_2O$ | 1 through 6%. |

Each glass substrate can be manufactured using the techniques familiar to those working in the field. The raw materials, generally in powder form, that are natural or by-products of the chemical industry, are mixed then placed in a furnace. The furnace may be heated by burners (aerial, immersed in the glass bath and/or in the ceiling of the furnace and acting on the raw materials or the glass bath) or again by using electrodes immersed in the glass bath, typically electrodes in molybdenum. The furnace should generally be constructed of refractory bricks, for example of silica, alumina, mullite (porcelainite), chromium oxide and/or in a solid solution of alumina-zircon-silica. The raw material reacts variously to the effect of the heat, leading to the obtaining of a bath of molten glass. The temperatures in the glass bath typically range between 1300 and 1700° C., especially between 1550 and 1650° C. The molten glass is then dispatched to the forming equipment: for example, forming through pouring into a tin fusion bath (the process known as making "float glass") or by using laminating rollers. The sheet of glass obtained is generally re-baked so as to eliminate any mechanical constraints that may arise in its during the cooling stage.

The electrochromic device of the invention preferably consists of, in order starting from an initial substrate or in the reverse order:
a transparent, electro-conductive layer,
a counter-electrode, so that ions with the same charge as the electrochromic material can be inserted reversibly,
a layer of ionic electrolytic conductor,
a layer of electrochromic material, capable of inserting ions reversibly and simultaneously, in which the states of oxidation corresponding to the inserted and removed states acquire a distinctive coloration when subjected to the appropriate electrical energy; one of these presents with greater light transmission than the other, second transparent electro-conductive layer.
a $2^{nd}$ transparent, electro-conductive layer, As an alternative, the order of layers between the two transparent conductive layers could be reversed: first the electrochromic material then the electrolyte and finally the counter-electrode.

The electrochromic material should preferably have a tungsten oxide base (as a cathodic electrochromic material) or one of iridium oxide (an anodic electrochromic material). These materials can insert cations, and especially lithium protons or ions.

The counter-electrode should preferably consist of a neutral, colored layer or one that is at least transparent or only slightly colored when the electrochromic layer is in the colored state. A counter-electrode should preferably be based on an oxide of an element such as tungsten, nickel, iridium, chromium, iron, cobalt or rhodium, or based on a mixed oxide of at least two of these elements, especially a nickel and tungsten oxide mixture. If the electrochromic material consists of tungsten oxide, a cathodic electrochromic material, of which the colored state represents its most reduced state, the nickel oxide or iridium oxide-based anodic electrochromic material could be used, for example, as the counter-electrode. This could involve, in particular, a layer of mixed vanadium and tungsten oxides or a nickel and tungsten oxide mixture. If the electrochromic material is iridium oxide, a cathodic electrochromic material, for example, one based on tungsten oxide, could play the part of the counter-electrode. Optically neutral material could also be used in the oxidation states in question, such as for example cerium oxide or organic materials such as electronic conductive polymers (polyaniline) or Prussian Blue.

Using the first method of implementation, the electrolyte presents in the form of a polymer or a gel, especially a protonic conductivity polymer, for example, like those described in European patents EP 0 253 713 and EP 0 670 346, or a polymer for conducting lithium ions, for example, as described in the patents EP 0 382 623, EP 0 518 754 or EP 0 532 408. These are then referred to as mixed electrochromic systems.

According to a second method of implementation, the electrolyte is constituted from a mineral layer forming an ionic conductor that it electrically isolated. These electrochromic systems are then referred to as being "all-solid." See European patents EP 0 867 752 and EP 0 831 360.

The device of the invention can also be of the "all-polymer" type, in which two electro-conductive layers are placed either side of a stack consisting of a cathodic coloration polymer, an ionic conductor electronic insulating polymer (and $H^+$ especially or $Li^+$) and finally an anodic coloration polymer (such as polyaniline or polypyrrole).

Electrochromic stacking may also consist of various layers, and especially sub-layers, top layers, or intermediate layers destined, for example, to facilitate the deposit of a subsequent layer or to protect certain layers against mechanical or chemical attack (resistance to corrosion, abrasion etc. Electrochromic stacking can, for example, be covered with a silica-based and/or alumina-based protective layer.

The device in the invention can be manufactured as follows: a lower electro-conductive electrode is placed on the supporting substrate, whether this substrate is transparent or otherwise, generally consisting of a layer of indium and tin oxide (ITO) or a layer of fluorine-doped tin oxide, for example, electrochromic functional layers, of iridium oxide (IrOx), tungsten oxide ($WO_3$), tantalum oxide ($Ta_2O_5$), and an upper electro-conductive electrode.

Of course, both the lower and upper electro-conductive electrodes must be attached to connectors in order to supply them with the respective currents. The connection is normally obtained by using metal foils that are placed respectively in contact with the upper and the lower electrodes.

The electrochromic device generally has a second substrate (the first substrate being that on which the electrochromic stack is deposited). Several methods of achieving this are possible: the two substrates may be laminated, in that a laminated polymer (especially one with a polyvinyl butyral base, or one consisting of a copolymer of ethylene and vinyl acetate-EVA-or even one made of polyurethane) is placed in contact in between the first substrate covered in its stack and the second substrate. Both substrates can be installed alternatively as double-glazing, as long as there is a gap between the second and first substrate, generally by means of a surrounding frame that inserts a layer of gas between the two substrates. The gas should preferably be argon. In both cases, the electrochromic stack is placed between the two substrates in such a way as to be protected against any type of chemical or mechanical attack.

FIG. 1 represents schematically an electrochromic device according to the invention.

In reference to FIG. 1, the electrochromic device of the invention should preferably be "entirely solid" and consist successively of:

an initial glass substrate S1 of which the linear thermal expansion coefficient of between 35 and $60 \cdot 10^{-7}/°$ C., a lower electro-conductive layer 2, preferably ITO-based, for example 250 nm thick, and especially deposited when hot, whose square resistance is in the order of 10 Ohms; a variation could consist of a layer of tin-doped fluorine or antimony oxide, or multiple layers consisting of a stack of layers of the ITO/ZnO:Al/Ag/ZnO:Al/ITO type, especially respective thicknesses of 15 to 20 nm for ITO/60 to 80 nm for the ZnO:Al/3 to 15 nm for silver/60 to 80 nm for ZnO:Al/15 to 20 nm for ITO, an electrochromic system 3 whose structure is notably that described hereunder, an upper electro-conductive layer 4, preferably based on ITO, for example 110 nm thick, or $SnO_2$:F, or, as a variation, an upper electro-conductive layer consisting of other conductive elements. This could more particularly consist of associating the electro-conductive layer with a layer that exceeds it in conductivity and/or a number of conductive strips or wires. For more details, please refers to application WO-00/57243 for the implementation of such multi-component electro-conductive layers. A preferred method of production of this type of electro-conductive layer consists in applying to the ITO layer (that may or may not be covered in one or more conductive layers) a network of conducting wires 6 laid on the surface of a polymer sheet 7, this sheet 7 serving as intermediate sheeting that makes it possible to assemble the assembly on a second substrate S2, and link the electrochromic stack to one of the current leads (not shown), a second glass substrate S2 whose linear thermal expansion coefficient may also be between 35 and $60 \cdot 10^{-7}/°$ C.

Electrochromic stack 3 should preferably:

serve as a counter-electrode, a layer of anodic electrochromic material EC1 of iridium oxide (hydrate) with a thickness of 40 through 100 nm or nickel oxide, hydrated or otherwise of 40 through 400 nm thickness, that may or may not be alloyed with other metals, a layer functioning as an electrolyte EL consisting of a layer of tungsten oxide, typically 100 nm thick, followed by an oxide layer that could be any of the following: hydrated tantalum oxide, hydrated silicon oxide, hydrated zirconium oxide, hydrated antimony oxide, or any mixture thereof, typically 250 nm thick.

a layer of cathodic electrochromic material EC2 based on tungsten $WO_3$ or a mixed vanadium and tungsten oxide, for example 500 nm thick.

Another preferred electrochromic stack consists, starting in order from the first substrate:

a layer of cathodic electrochromic material based on tungsten oxide $WO_3$ for example 300 nm thick, a layer serving as an electrolyte EL consisting of a layer of tungsten oxide, typically 180 nm thick then a layer of silicon oxide, typically 50 nm thick, a counter-electrode of a mixed nickel and tungsten oxide, for example 250 nm thick. This stack is inserted between two transparent electrodes, typically based on ITO and/or tin-doped oxide. In a stack of this type, the cation that could be inserted or removed should preferably be lithium.

This set of layers should preferably be deposited by means of magnetic field-assisted cathodic pulverization. As a variation, it could be obtained through thermal evaporation or evaporation assisted by a flow of electrons, by laser ablation, by chemical vapor deposition (CVD), possibly assisted by plasma or microwaves, or by an atmospheric pressure technique, especially by the deposit of especially by tempering, spray-coating or laminar induction.

Active stacking 3 can be incised over all or part of the periphery by means of channels produced by mechanical means or by laser radiation, that can be pulsed so as to reduce peripheral electricity leaks as described in French application FR-2 781 084.

Furthermore, the device would preferably incorporate an initial peripheral joint in contact with surfaces 2 and 3 (2 and 3 being the conventional numbering of the inner surfaces of substrates S1 and S2), this first joint being adapted to create a barrier to external chemical attack.

A second peripheral joint (not shown in the FIGURE) is in contact with the edge of S1, S2, and surfaces 1 and 4 (1 and 4 being the agreed numbering of the external surfaces of the substrates S1 and S2), so as to create a means of installing with the means of transport, waterproofing between the interior and exterior, an esthetic function, and a means of incorporating reinforcements.

The devices or electrochromic glass panels have applications in controlling the amount of sun passing through windows installed on the outside of buildings or vehicles of the automobile, train, or airplane type (portholes, for example). The aim is to be able to reduce the overheating of cockpits/automobiles and other interiors, though only in cases where there is excessive sunlight.

It can also be used to control the degree of visibility through window panes, especially in order to obscure them, or even to prevent anything being seen through them when this is desirable. This could be used to prevent any visibility when this is desirable. This could involve glass mounted as internal partitions in buildings, railroad trains, aircraft, or mounted as automobile side-windows. This could also include the mirrors used as rear-view mirrors, to prevent a driver being blinded, or for panels displaying messages so that the messages appear when necessary, or intermittently in order to best attract attention.

The subject of the invention is thus also glazing for buildings or for transportation vehicles, partitions, rear-view mirrors, or a message panel containing a device based on the invention.

The following examples illustrate the invention without, however, restricting it.

Tables 1 and 2 hereunder provide a few examples of the composition of glass that could be used for substrates incorporated into electrochromic devices based on the invention.

Each of these tables shows the mass oxide content (expressed in %) and the thermal expansion coefficient noted as "CTE" and expressed in $10^{-7}/°C$. The linear thermal expansion coefficient is typically measured on the basis of the standard NF-B30-103.

TABLE 1

|  | 1 | 2 | 3 | 4 | 5 | 6 | 7 |
|---|---|---|---|---|---|---|---|
| $SiO_2$ (%) | 68.2 | 63.3 | 64.8 | 70.5 | 57 | 60 | 60.5 |
| $B_2O_3$ (%) | — | — | 10 | 5.8 | 4 | 5 | — |
| $Al_2O_3$ (%) | 9.3 | 11.2 | 14 | 10 | 16 | 18 | 14.6 |
| MgO (%) | 5 | 8 | 1.8 | 2.4 | 7 | 8 | 0.05 |
| CaO (%) | 17.5 | 17.5 | 2.5 | 3.1 | 10 | 8 | 11.5 |
| SrO (%) | — | — | — | — | — | — | 0.2 |
| BaO (%) | — | — | 2.7 | 3 | 6 | — | 13 |
| $Na_2O$ (%) | — | — | 4 | 5 | — | 1 | — |
| CTE ($10^{-7}/°C$) | 46 | 47 | 42 | 46 | 46 | 42 | 50 |

TABLE 2

|  | 8 | 9 | 10 | 11 | 12 | 13 | 14 |
|---|---|---|---|---|---|---|---|
| $SiO_2$ (%) | 59.4 | 51.9 | 72 | 65 | 74.9 | 70 | 64.9 |
| $B_2O_3$ (%) | 4.5 | 8 | 12 | 3 | 17 | 18 | 9.1 |
| $Al_2O_3$ (%) | 16.5 | 20.5 | 6 | 13.6 | 1.7 | 2.5 | 16.5 |
| MgO (%) | 8.2 | 8.9 | 0.4 | 0.5 | 0.4 | 0.5 | 1.6 |
| CaO (%) | 11.4 | 9.4 | 1.2 | 7.9 | 0.6 | 1 | 5.5 |
| SrO (%) | — | — | — | 3 | — | — | 1.8 |
| BaO (%) | — | — | 4.3 | 5.1 | — | — | — |
| $Li_2O$ (%) | — | — | — | — | — | 0.5 | — |
| $Na_2O$ (%) | — | 1.3 | 2.8 | 1.1 | 3.8 | 0.5 | — |
| $K_2O$ (%) | — | — | 0.9 | 0.9 | 1.5 | 6.5 | 0.6 |
| CTE ($10^{-7}/°C$) | 45 | 41 | 38 | 48 | 38 | 43 | 36 |

Glass substrates presenting with these compositions are obtained by floating, then incorporated into the electrochromic device in FIG. 1 as the initial substrate on which the electrochromic stack is deposited.

The glass obtained behaves as well or even better thermo-mechanically than electrochromic glass manufactured on tempered or hardened soda-lime-silica. In the other hand, the absence of restrictions means that this glass can be cut to fit. It is therefore possible to lay down layers of electrochromic stacking on large substrates, which can then be cut to fit the coated substrates to the desired size.

The invention claimed is:

1. An electrochromic device comprising a first substrate of untempered glass of which the linear thermal expansion coefficient is between about 35 and about $60 \times 10^{-7}/°C$., said substrate being coated with a stack comprising at least one transparent electro-conductive layer, a layer of an electrochromic material, a layer of an ionic electrolytic conductor and a counter-electrode, and wherein said first substrate is laminated to a second substrate substantially the same size as said first substrate, and wherein said second substrate has a linear thermal expansion coefficient between about 35 and about $60 \times 10^{-7}/°C$.

2. The device of claim 1, wherein said first glass substrate possesses a linear thermal expansion coefficient less than or equal to about $50 \times 10^{-7}/°C$., or less than or equal to about $45 \times 10^{-7}/°C$.

3. The device of claim 1, wherein said first glass substrate has a chemical composition comprising the following, within the mass limits defined hereunder:

| $SiO_2$ | about 50 through 82% |
|---|---|
| $B_2O_3$ | about 0 through 20% |
| $Al_2O_3$ | about 0 through 22% |
| MgO | about 0 through 10% |
| CaO | about 0 through 15% |
| SrO | about 0 through 5% |
| BaO | about 0 through 15% |
| CaO + MgO + BaO + SrO | about 0 through 15% |
| $Na_2O$ | about 0 through 6% |
| $K_2O$ | about 0 through 8%, and |
| $Na_2O + K_2O$ | about 0 through 8%. |

4. The device of claim 1, wherein said first glass substrate has a chemical composition comprising the following constituents, with the mass limits defined below:

| $SiO_2$ | about 50 through 60% |
|---|---|
| $B_2O_3$ | about 10 through 15% |
| $Al_2O_3$ | about 10 through 15% |
| MgO | about 2 through 5% |
| CaO | about 2 through 5% |
| SrO | about 0 through 1% |
| BaO | about 0 through 1% |
| CaO + MgO + BaO + SrO | about 5 through 15% |
| $Na_2O$ | about 0 through 5% |
| $K_2O$ | about 0 through 5%, and |
| $Na_2O + K_2O$ | about 1 through 6%. |

5. The device of claim 1, wherein said first substrate comprises, in order, starting from an initial substrate or in the reverse order:

a transparent electro-conductive layer, a counter-electrode, an ionic conductive electrolyte layer, a layer of an electrochromic material, and a second transparent electro-conductive layer.

6. The device of claim 1, wherein the electrochromic material is based on a material selected from the group consisting of tungsten oxide and iridium oxide.

7. The device of claim 1, wherein the counter-electrode comprises a material selected from the group consisting of tungsten, nickel, iridium, chromium, iron, cobalt, rhodium, and mixed oxides of at least two of these oxides.

8. The device of claim 1, wherein the electrolyte comprises a mineral layer forming an ionic conductor that is electrically insulated.

9. A glazing for a building or vehicle partition, rear-view mirror or indicator board comprising the device of claim 1.

10. The device of claim 7, wherein said mixed oxide is selected from a mixed nickel and tungsten oxide.

11. The device of claim 1, wherein a composition of said first substrate comprises the following

| | |
|---|---|
| SiO$_2$ | about 57 through 70.5% |
| B$_2$O$_3$ | about 0 through 10% |
| Al$_2$O$_2$ | about 10 through 14.6% |
| MgO | about 0.05 through 8% |
| CaO | about 2.5 through 17.5% |
| SrO | about 0 through 0.2% |
| BaO | about 0 through 13%; | and wherein said linear thermal expansion coefficient ranges from about 42 to about $50 \times 10^{-7}/°$ C.

12. The device of claim 1, wherein a composition of said first substrate comprises the following

| | |
|---|---|
| SiO$_2$ | about 51.9 through 74.9% |
| B$_2$O$_3$ | about 3 through 18% |
| Al$_2$O$_2$ | about 1.7 through 20.5% |
| MgO | about 0.4 through 8.9% |
| CaO | about 0.6 through 11.4% |
| SrO | about 0 through 1.3% |
| BaO | about 0 through 5.1%; | and wherein said linear thermal expansion coefficient ranges from about 36 to about $48 \times 10^{-7}/°$ C.

13. The electrochromic device of claim 1, wherein said electrochromic device further comprises a polymer sheet between said second substrate and an upper electro-conductive layer.

14. The electrochromic device of claim 1, wherein said stack is laminated between said first and second substrates.

15. An electrochromic device comprising a first substrate of untempered glass of which the linear thermal expansion coefficient is between about 35 and about $60 \times 10^{-7}/°$ C., said substrate being coated with a stack comprising at least one transparent electro-conductive layer, a layer of an electrochromic material, a layer of an ionic electrolytic conductor and a counter-electrode, and wherein said first substrate is strengthened by combining it with a second substrate substantially the same size as said first substrate, and wherein said second substrate has a linear thermal expansion coefficient between about 35 and about $60 \times 10^{-7}/°$ C.

* * * * *